US009630598B2

(12) United States Patent
Svensson et al.

(10) Patent No.: US 9,630,598 B2
(45) Date of Patent: Apr. 25, 2017

(54) METHOD FOR OPERATING A HYDRAULIC BRAKE SYSTEM OF A MOTOR VEHICLE AND A HYDRAULIC BRAKING SYSTEM

(71) Applicant: Ford Global Technologies, LLC, Dearborn, MI (US)

(72) Inventors: Thomas Svensson, Leichlingen (DE); Ian Moore, Pulheim (DE); Rudolf Daniels, Wermelskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 14/686,649

(22) Filed: Apr. 14, 2015

(65) Prior Publication Data
US 2015/0217735 A1 Aug. 6, 2015

Related U.S. Application Data

(63) Continuation of application No. 13/733,041, filed on Jan. 2, 2013, now Pat. No. 9,004,615.

(30) Foreign Application Priority Data

Jan. 2, 2012 (DE) .................. 10 2012 200 007

(51) Int. Cl.
*B60T 7/06* (2006.01)
*B60T 13/16* (2006.01)
(Continued)

(52) U.S. Cl.
CPC ............... *B60T 7/06* (2013.01); *B60T 8/442* (2013.01); *B60T 8/445* (2013.01); *B60T 11/28* (2013.01);
(Continued)

(58) Field of Classification Search
CPC ........ B60T 8/4081; B60T 8/3275; B60T 7/06; B60T 13/161; B60T 13/66; B60T 17/02
(Continued)

(56) References Cited

U.S. PATENT DOCUMENTS 4,783,125 A 11/1988 Belart et al.
5,040,852 A 8/1991 Takata
(Continued)

FOREIGN PATENT DOCUMENTS

DE 3607367 A1 9/1987
DE 4000324 A1 7/1991
EP 0391353 A1 10/1990

OTHER PUBLICATIONS

Anonymous, "Braking Compensation of Excess Drive Torque," IPCOM No. 000156863, Published Aug. 7, 2007, 3 pages.
(Continued)

*Primary Examiner* — Melanie Torres Williams
(74) *Attorney, Agent, or Firm* — Raymond Coppiellie; McCoy Russell LLP

(57) ABSTRACT

A method for operating a hydraulic brake system of a motor vehicle, comprising a pressure generating device used to build up additional brake pressure in a master brake cylinder or in addition to a master brake cylinder and in opposition to further pedal actuation wherein the additional pressure is a function of the pedal actuation travel distance. A method that reduces the limitations of a braking system's physical parameters on the build-up of additional braking pressure.

16 Claims, 3 Drawing Sheets

(51) Int. Cl.
*B60T 17/02* (2006.01)
*B60T 8/44* (2006.01)
*B60T 11/28* (2006.01)
*B60T 13/66* (2006.01)

(52) U.S. Cl.
CPC ............ *B60T 13/161* (2013.01); *B60T 13/66* (2013.01); *B60T 13/662* (2013.01); *B60T 17/02* (2013.01)

(58) Field of Classification Search
USPC .................................. 303/10, 11, 155, 113.4
See application file for complete search history.

(56) References Cited

U.S. PATENT DOCUMENTS

| | | | | |
|---|---|---|---|---|
| 5,197,788 | A * | 3/1993 | Fennel | B60T 8/17616 |
| | | | | 303/113.4 |
| 5,941,608 | A * | 8/1999 | Campau | B60T 7/042 |
| | | | | 303/113.4 |
| 6,345,871 | B1 * | 2/2002 | Harris | B60T 8/321 |
| | | | | 303/113.4 |
| 2013/0162012 | A1 * | 6/2013 | Ishida | B60T 8/4077 |
| | | | | 303/11 |

OTHER PUBLICATIONS

Partial Translation of Office Action of Chinese Application No. 201210572533.8, Issued Feb. 23, 2016, State Intellectual Property Office of PRC, 7 Pages.

* cited by examiner

METHOD FOR OPERATING A HYDRAULIC BRAKE SYSTEM OF A MOTOR VEHICLE AND A HYDRAULIC BRAKING SYSTEM

CROSS REFERENCE TO RELATED APPLICATIONS

This application is a continuation of U.S. patent application Ser. No. 13/733,041, entitled "METHOD FOR OPERATING A HYDRAULIC BRAKE SYSTEM OF A MOTOR VEHICLE AND A HYDRAULIC BRAKING SYSTEM," filed on Jan. 2, 2013, now U.S. Pat. No. 9,004,615, which claims priority to German application number 102012200007.0, filed on Jan. 2, 2012, the entire contents of each of which are hereby incorporated herein by reference for all purposes.

SUMMARY AND BACKGROUND

Modern automobiles regularly employ hydraulic braking systems. In this system the pressure applied to the brake pedal displaces a piston in a pressurized fluid chamber or master brake cylinder. In a dual circuit braking system pressure is generally applied to two braking systems via a tandem master cylinder, comprising two pressure chambers coupled, in series, by a secondary piston. A braking force amplifier may be incorporated into the master brake cylinder generating additional force proportional to the actuation of the brake pedal acting in the direction of actuation. The master brake cylinder is generally coupled to one or more wheel brake cylinders via hydraulic lines. The subsequent displacement of brake fluid transmits the pressure from brake pedal actuation to the brake linings, or brake shoes, forcing them into contact with the brake drum or brake disk. Deceleration is then achieved by the frictional force of the brakes acting against the rotation of the wheel. This direct coupling enables the braking force to be metered by the actuation of the brake pedal.

The sensitivity of the braking force to braking pedal actuation is influenced by the available actuation distance of the brake pedal. This distance is constrained by the installation space provided for the brake pedal and master brake cylinder dimensions. It is further limited by the operability of the brake pedal and the ease in which the motorist can negotiate between acceleration pedal and brake pedal. Finally, it is constrained by the motorist's ability to apply sufficiently high force throughout the total actuation distance of the brake pedal.

Brake pedals can therefore reach their physical travel limits by hitting the vehicle floor pan, or the master cylinder hits its end stop, preventing further pressure build up in the braking system, limiting the rate of vehicle deceleration. This is compounded when gas bubbles are present in the braking system increasing the brake pedal travel required for the brake linings to come into contact with the brake disk or brake drum.

The inventors recognized this design constriction and created a hydraulic brake system and operating method to reduce the effects of the physical limitations of the braking system. In one example, a method comprises generating braking pressure within the master cylinder of a hydraulic braking system via brake pedal actuation; and generating additional pressure within the master brake cylinder or in addition to the master brake cylinder in response to brake pedal actuation distance via an additional pressure generating device. In this way, it is possible to increase the braking force while reducing interference from the floor.

In another example, a system applies a resistive brake pedal pressure in response to a decrease of the residual actuation travel of the brake pedal and/or master brake cylinder and a corresponding increase in pressure delivered by the master brake cylinder. The "residual actuation travel distance" of the brake pedal is the remaining actuation distance available to the brake pedal before coming to a stop due to contact with the vehicle floor panel or the master brake cylinder hits its end stop. A minimal actuation distance can be a predetermined residual actuation distance. This is a predetermined brake pedal position and remaining travel or angle threshold. Brake pedal position can be monitored by sensors in the master brake cylinder determining brake pedal displacement from a no-load position and/or remaining available displacement distance. Sensors can also be incorporated into the brake pedal to determine pedal angle, displacement and/or remaining available travel. This may be utilized to continuously compare the prevailing residual actuation travel distance with the minimum residual actuation distance thus providing the ability to monitor both linear and angular actuation travel distance.

The minimum residual travel position can be used as a threshold to activate or regulate the resistive pressure applied against actuation of the brake pedal or the master braking cylinder and the corresponding increase in pressure delivered by the master brake cylinder. The pressure generating device may provide additional pressure to the master brake cylinder or in addition to the master brake cylinder. The pressure generating device can, in particular, be embodied as a pump or pressure reservoir connected to the master brake cylinder and/or the brake circuits. The device may also be connected to one or more brake circuit for activation purposes. The additional brake pressure in the master brake cylinder or in addition to the master brake cylinder is transmitted to one or more wheel brake devices generating additional braking force. The additional braking force creates a corresponding counter force exerted by way of the piston to the brake pedal resisting the further travel of the brake pedal. By virtue, the increased resistive force can provide an increase to the total force available for transmission to the braking system before the pedal and/or master braking cylinder meets its physical limits while preserving the required travel distance. As a consequence, a reduction in brake travel distance can be achieved and the effect of gas bubbles in the braking system can be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for modulating the pressure applied by the actuation of a brake pedal in a hydraulic braking system of a motor vehicle. A hydraulic brake system, such as the system schematically illustrated in FIG. 1, in a motor vehicle may include a master brake cylinder that can be actuated by means of a brake pedal in order to generate brake pressure to one or more wheel brake devices in fluid-flow communication with the master brake cylinder. The brake system may include or interact with a control system which may be embodied to receive a signal from sensors to actuate an additional pressure generating device within the brake system. These sensors may be utilized to determine if a minimum residual actuation travel of the brake pedal is available and, by way of the control system, initialize and control the build up additional brake pressure in the master brake cylinder or in addition to the master brake cylinder by the additional pressure generating device.

The pressure generating device may be controlled in such a manner that a counter force generated, in some part, by the master brake cylinder acts on the brake pedal in the opposite direction to pedal actuation. The counter force may continuously increase as the brake pedal is further actuated. For this purpose, the additional actuation travel distance can, for example, be sensed once the pressure generating device has been activated and additional pressure may increase according to the additional actuation travel distance, this may increase in a linear or progressive manner and may be generated in the master brake cylinder or in addition to the master brake cylinder and/or in one or more brake circuit. As a consequence, the operability of the brake system is increased.

Figure 2:
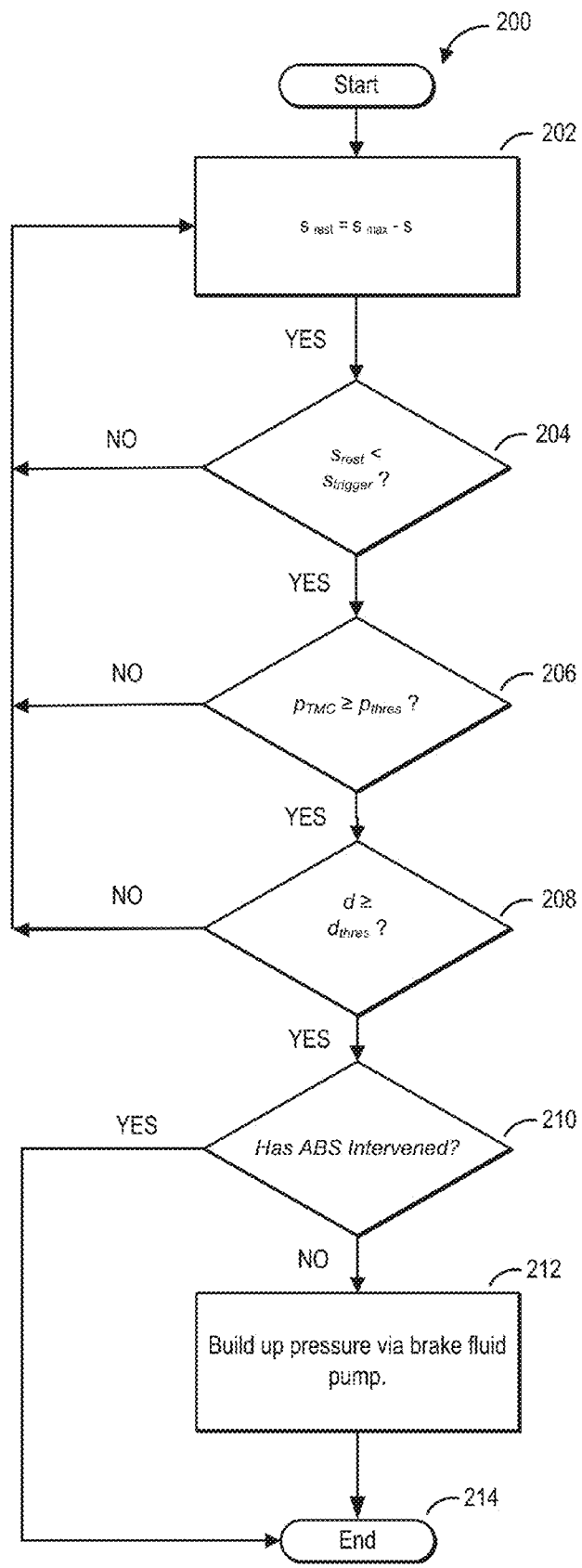
FIG. 2 shows a flow diagram of an example method for generating additional brake pressure within a hydraulic braking system.
Figure 3:
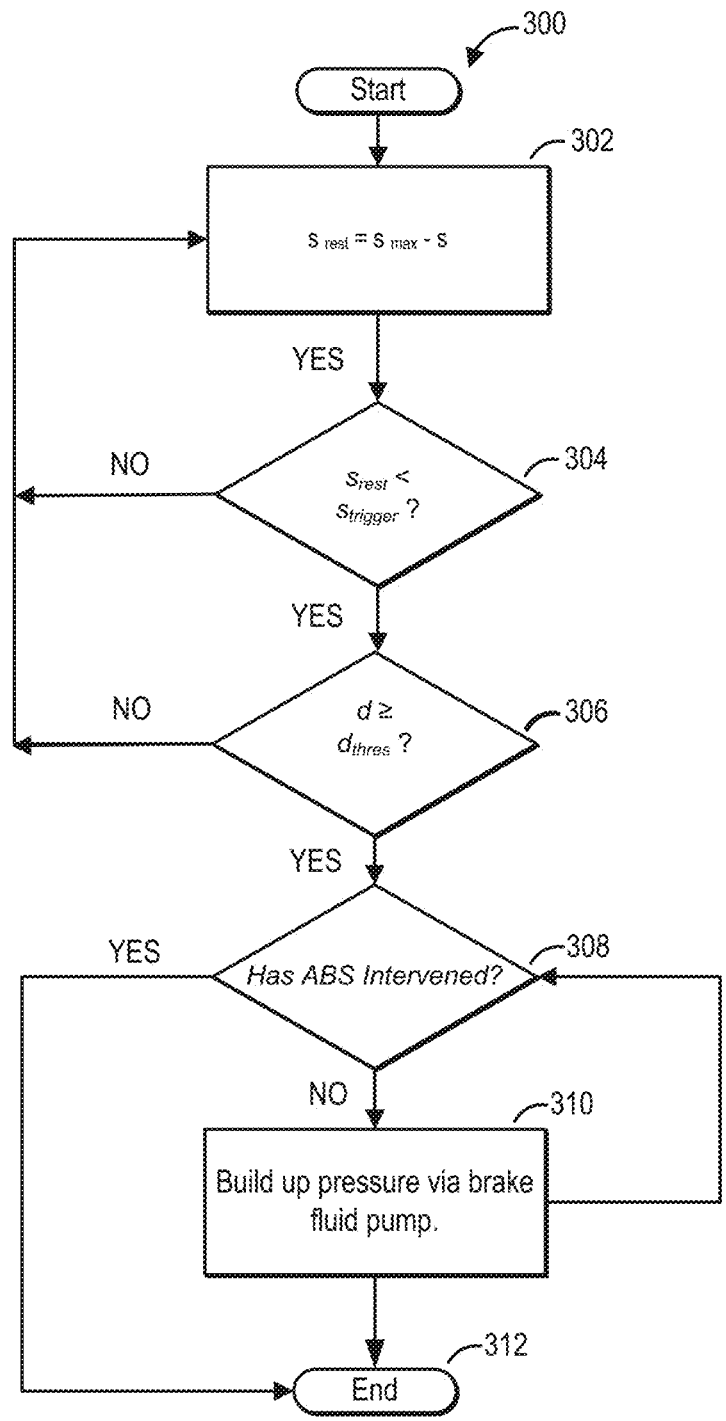
FIG. 3 shows a flow diagram of an alternative example method for generating additional brake pressure within a hydraulic braking system.

A control system may be configured to perform a control routine, such as the routine described in FIG. 2, to increase the pressure both to the brake pedal and against the actuation of the brake pedal in response to residual pedal actuation distance via brake fluid pressure. FIG. 3 shows a control system configuration that may respond to the residual brake pedal actuation, brake fluid pressure and vehicle deceleration.

Figure 1:
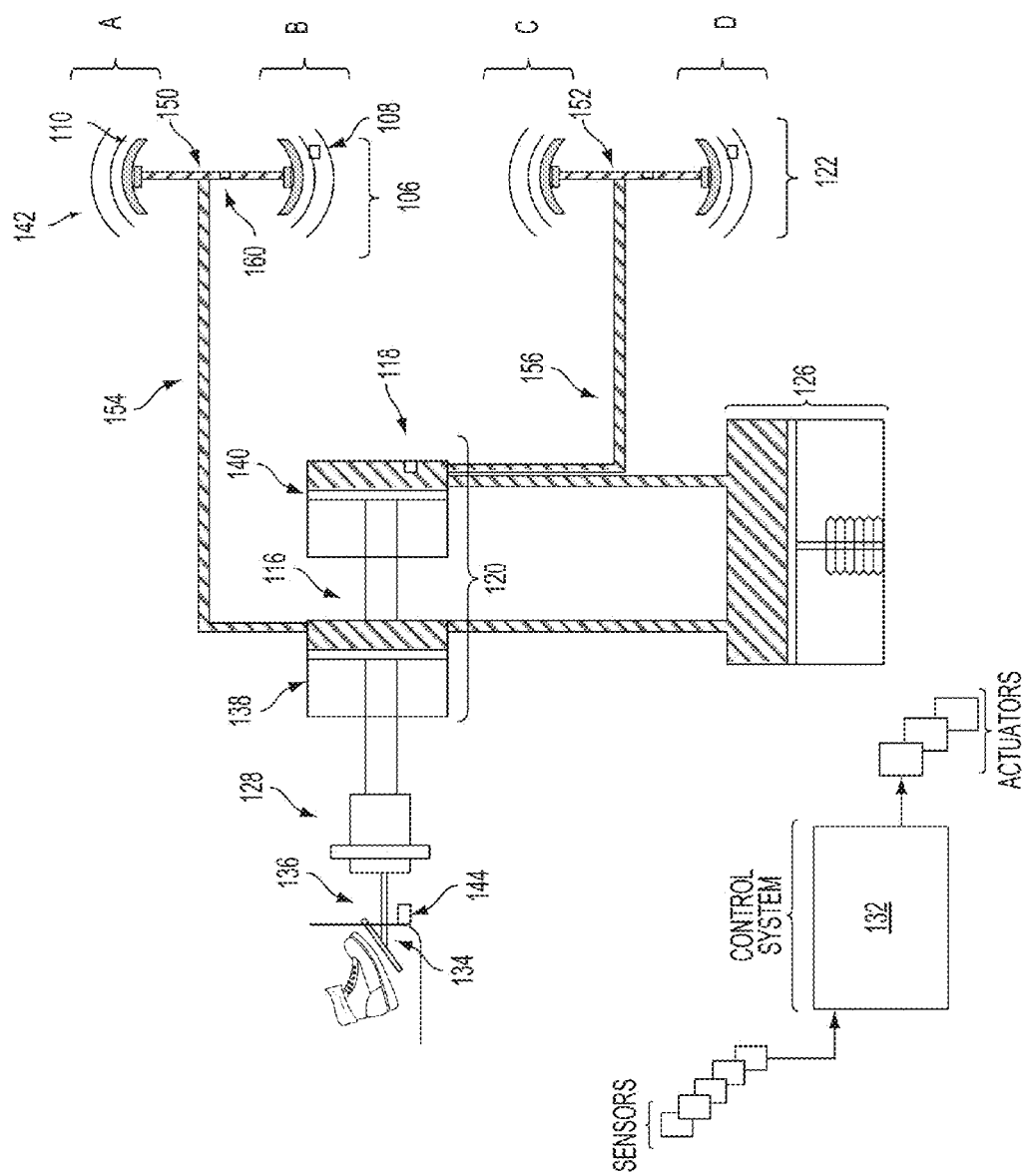
FIG. 1 shows a schematic example of a hydraulic braking system of a motor vehicle.

FIG. 1 schematically illustrates an example of a hydraulic braking system in a vehicle and may be embodied as a diagonal split braking system. The letters A-D represent individual wheels that may have any arrangement, for example, A and C may represent the two front wheels and B and D may represent the two back wheels from right to left, respectively. In this example brake pressure is initiated by the actuation of brake pedal 134, coupled to piston 136 that may be amplified by an external force amplifier embodied as a brake boost vacuum 128. The amplified brake pressure may then be transmitted to the brake master cylinder. In many vehicles the master brake cylinder is generally embodied as a tandem master cylinder 120 to allow brake pressure to be applied to independent hydraulic braking circuits. A tandem master cylinder 120 may couple brake fluid filled pressure chamber within the two hydraulic cylinders 138 and 140 in series via a secondary piston 116. In this way, pressure can be correspondingly transmitted from the tandem master cylinder 120 to the two wheel brake circuits, 106 and 122. In this example, the pressure generated within the master cylinder 120 is transmitted by way of hydraulic lines 154 and 156 to wheel brake cylinders 150 and 152. In brake circuit 106, for example, the pressure increase of the brake fluid within the wheel brake cylinder 150 pushes the brake disk 110 into contact with a brake lining 142. In this manner, the braking force that acts on the brake lining 142 connected to the brake disk 110 can be metered by actuating the brake pedal 134.

In this embodiment, actuating brake pedal 134 generates pressure in the pressure chambers of the master brake cylinder 120, this pushes brake fluid out of the pressure chamber in order to actuate the wheel brake cylinders 150 and 152. In order to generate a high braking force and meter that braking force in a sensitive manner, it would be desirable if a long actuation travel distance were available for the brake pedal 134. On the other hand, the entire available actuation travel distance of the brake pedal is limited by the installation space available for the brake pedal 134 and the master brake cylinder 120. In addition, the operability of the brake pedal also necessitates a limit on the pedal travel distance so that the driver of the vehicle may easily negotiate between the gas pedal and brake pedal to enable a rapid reaction to unexpected braking situations. Finally, it is desirable for the required actuation travel distance to be able to be travelled sufficiently rapidly and with reasonable force. It is therefore not always possible to ensure that, in the case of the total actuation travel distance available to the brake pedal, a desired degree of braking force can be generated in all operating conditions. Thus the situation can occur, for example, that the driver exerts a great force on the pedal in order to generate a high braking force, however, in so doing the brake pedal is depressed to such an extent that it arrives at a stop and the brake pedal possibly contacts the vehicle floor pan. It is then no longer possible to further increase the braking force corresponding to the force generated by the driver, limiting further build-up of pressure in the brake system and creating an undesired long brake travel distance.

As schematically illustrated in FIG. 1, sensors may be utilized in various locations within the braking system to communicate with the control system the actuation of the master brake cylinder or brake pedal in reference to it physical parameters. A brake pedal actuation sensor 144 may be utilized to monitor the linear or angular displacement of the brake pedal. A master cylinder sensor 118 may be utilized within one or more chambers of a master brake cylinder to monitor brake fluid pressure and/or piston actuation. A wheel sensor 108 may be integrated into one or more wheels of the vehicle to monitor linear or rotational velocity or acceleration. These sensors may communicate with a control system 132 which may, in turn, actuate additional brake pressure to the master brake cylinder 120 and/or in opposition to the actuation of brake pedal 134 via some additional pressure generating device. In this embodiment, the pressure generating device is an additional fluid chamber 126 actuated by the control system in response to one of the aforementioned sensors. One or more of these sensors may also be integrated into an anti-lock braking system (ABS) or electronic stability control (ESC) (not shown) operated by the control system 132. Within the control system 132 the activation of ABS or ESC may suspend or reduce the activation of the additional pressure generating device. This additional pressure generating device may be employed to slow or eliminate the brake pedal or master cylinder reaching its physical parameters before the vehicle has reached the desired deceleration, possibly by hitting the metal floor plate or the end of the master cylinder respectively.

FIG. 2 illustrates an example method of generating additional brake pedal pressure in response to the parameters and actuation of components within the brake system. In accordance with a first embodiment of the invention, a residual actuation travel distance is determined as the brake pedal of a motor vehicle is actuated, for example, by sensing a position of the brake pedal or of an actuation travel distance s that has been traveled from a no-load position with the aid of a position sensor or a travel sensor. By comparison with a predetermined total actuation travel distance $s_{max}$, which is available starting from a no-load position for the actuation of the brake pedal, a prevailing remaining residual actuation travel distance $s_{rest}$ of the brake pedal up to arriving at the stop, possibly until the brake pedal lies against the floor sheet metal plate, is determined at 202:

$$s_{rest}=s_{max}-s.$$

If the prevailing remaining residual actuation travel distance $s_{rest}$ is shorter than a predetermined minimum residual actuation travel distance $s_{trigger}$, $$s_{rest}<s_{trigger},$$

then the additional steps of the method are instigated; otherwise the prevailing residual actuation travel distance $s_{rest}$ is cyclically determined and compared with the minimum residual actuation travel distance $s_{trigger}$ at 204. If the brake pedal is released and it returns to its no-load position, which can likewise be established on the basis of the signal from the position sensor and/or travel sensor, then the method is terminated and re-started upon the next actuation of the brake pedal (not illustrated in FIG. 2).

If the prevailing residual actuation travel distance $s_{rest}$ that has been determined in the described manner is shorter than the minimum residual actuation travel distance $s_{trigger}$, then a check may be performed as to whether the brake fluid pressure $p_{TMC}$ in the master brake cylinder achieves or exceeds a predetermined threshold value $p_{thres}$ of the pressure at 206, which can be sensed possibly by means of a pressure sensor provided within the scope of a road handling control. If this is not the case, then the method returns back in order to determine the residual actuation travel distance $s_{rest}$.

If the predetermined threshold value $p_{thres}$ is achieved or exceeded:

$$p_{TMC} \geq p_{thres},$$

then a prevailing deceleration value d, which is determined by means of an acceleration sensor and can be available within an information system of the motor vehicle, is compared with a predetermined threshold value $d_{thres}$ of the deceleration at 208. In so doing, the deceleration d is measured in the longitudinal direction of the motor vehicle so that, for example, a deceleration is registered even when travelling at a constant velocity on an incline. In the case of a deceleration d below the threshold value $d_{thres}$, intervention is not necessary in order to increase a brake pressure so that the method returns in order to determine the residual actuation travel distance $s_{rest}$. If the threshold value $d_{thres}$ is actually achieved or exceeded:

$$d \geq d_{thres},$$

then it is established whether an intervention of the ABS system and/or of an ABS function of ESC in the brake system is already activated at 210. This can be determined possibly with the aid of a data connection of a control system to a control device of ESC. The control device of the road handling control may itself be embodied in order to perform the method in accordance with the invention. If an intervention of an ABS system is already activated, then generally the maximum brake deceleration possible under the existing travel conditions and the brake pressure desirable for this purpose is achieved, so that a further increase of the brake pressure would not be expedient. If the ABS has not intervened, then a brake fluid pump may be activated in order to build up an additional brake pressure in the master brake cylinder or in addition to the master brake cylinder and/or in the brake circuit or brake circuits at 212. As a consequence, an increased braking effect is achieved and an increased counter pressure is exerted on the brake pedal. It is consequently difficult to further depress the brake pedal and the brake pedal may be prevented from arriving at the stop.

If the brake pressure has been increased to a level that cannot be achieved without locking the wheels or ABS system intervention, the method is terminated and/or the pressure generating device disabled. As a consequence, when these conditions are met, an embodiment may provide an increased brake deceleration and a decreased brake travel distance for the prevailing travel conditions. In an alternative embodiment the additional brake pressure may be regulated by conditions approaching a potential wheel lock and may be increased to a comparatively low value that may depend on the prevailing position of the brake pedal and consequently on the prevailing available residual actuation travel distance $s_{rest}$ (not illustrated in FIG. 2). As a consequence, the achievable brake pressure remains controllable by means of further actuating the brake pedal, improving the operability of the brake system.

In accordance with the embodiment schematically illustrated in FIG. 3, a check is not performed as to whether the brake pressure exceeds a threshold value of the pressure; otherwise the method performs as illustrated in FIG. 2. Additional brake pressure is therefore built up providing that the remaining conditions are fulfilled, even in the case of a comparatively lower pressure $p_{TMC}$ in the master brake cylinder. It is therefore possible to provide the desired build-up of brake pressure and increase brake system functionality in the event of gas bubbles in the brake circuit. Functionality is similarly increased in the event of the displacement of a piston of a wheel brake cylinder by reducing the resulting increased travel distance necessary to regenerate braking force.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a hydraulic brake system of a motor vehicle, comprising:
activating a pressure generating device used to build up additional brake pressure in a master brake cylinder or in addition to a master brake cylinder responsive to a predetermined minimum residual actuating travel distance of a brake pedal not being available, wherein the brake pedal of the motor vehicle is actuated in order to generate brake pressure in the master brake cylinder responsive to a prevailing deceleration of the motor vehicle, the pressure generating device controlled in such a manner that a counter force that acts on the brake pedal in an opposite direction to a direction of actuation continuously increases as the brake pedal is further actuated, wherein the residual actuating travel distance of the brake pedal is determined based on a no-load position of the brake pedal.

2. The method of claim 1, wherein the residual actuating travel distance of the brake pedal is determined by calculating a difference between a predetermined maximum actuation travel distance and an actuation travel distance actually travelled from the no-load position of the brake pedal.

3. The method of claim 1, wherein the motor vehicle comprises a road handling control and the pressure generating device is a brake fluid pump of the road handling control.

4. The method of claim 1, wherein the pressure generating device is only activated if an ABS device of the motor vehicle does not intervene.

5. The method of claim 1, wherein the pressure generating device is only activated if the prevailing deceleration of the motor vehicle exceeds a predetermined minimum deceleration.

6. The method of claim 1, wherein the pressure generating device is only activated if a prevailing brake pressure exceeds a predetermined minimum brake pressure.

7. A hydraulic brake system of a motor vehicle comprising:
a master brake cylinder that can be actuated by a brake pedal in order to generate a brake pressure;
at least one wheel brake device that is in fluid-flow communication with the master brake cylinder;
a pressure generating device in order to build up an additional brake pressure in the master brake cylinder; and
a controller including instructions to:
determine a predetermined minimum residual actuation travel distance of the brake pedal;
if the minimum residual actuation travel distance is not available, activate the pressure generating device, and
deactivate the pressure generating device upon activation of anti-lock braking, wherein the residual actuation travel distance of the brake pedal is determined based on a no-load position of the brake pedal.

8. The system of claim 7, further comprising a pressure generating device that creates an additional force working to oppose further pedal actuation.

9. The system of claim 7, wherein the vehicle is equipped with a road handling control tool and the pressure generating device is a brake fluid pump within the road handling control tool.

10. The system of claim 7, wherein the brake pressure in the master brake cylinder of the hydraulic brake system is amplified by another device.

11. The system of claim 7, wherein the master brake cylinder is embodied as a dual circuit tandem brake cylinder.

12. A method, comprising:
generating braking pressure within a master brake cylinder of a hydraulic braking system via brake pedal actuation; and
generating additional pressure within the master brake cylinder or in addition to the master brake cylinder in response to brake pedal actuation distance via an additional pressure generating device, wherein applying the additional pressure includes increasing continuously with increased pedal actuation, wherein applying additional brake pressure includes increasing as an available travel distance between a residual brake pedal actuation travel distance and a predetermined minimal residual actuation threshold decreases, and increasing as a travel distance between a predetermined maximum actuation travel distance and an actuation travel distance actually travelled from a no-load position of a brake pedal decreases.

13. The method of claim 12, wherein generating additional pressure is in addition to amplification of pressure transferred to the master brake cylinder via actuation of the brake pedal.

14. The method of claim 12, further comprising disabling the additional pressure generating device in response to activation of a road handling control tool and/or anti-lock braking, wherein the hydraulic braking system is a diagonal split braking system.

15. The method of claim 12, further including activating the additional pressure generating device when above a predetermined deceleration threshold.

16. The method of claim 12, further including activating the additional pressure generating device when above a predetermined minimum brake pressure threshold.

* * * * *